Patented Mar. 5, 1940

2,192,705

UNITED STATES PATENT OFFICE 2,192,705

COLORED RUBBERIZED FABRICS

William John Roy Evans and Walter Fairbairn Smith, Blackley, England, assignors to Imperial Chemical Industries Limited, a corporation of Great Britain No Drawing. Application August 26, 1936, Serial No. 98,066

2 Claims. (Cl. 91—68)

This invention relates to the manufacture of colored rubber compositions wherein materials of which india-rubber is an essential ingredient are colored in clear blue shades or in hues in which blue is a predominant component.

By the invention rubber materials may be colored in a range of shades varying from a deep blue to pale greenish blue, all brilliant, and the deeper shades being fuller than can be obtained with a hitherto used pigment such as ultramarine.

The coloring matter used according to the invention is a compound of the class known as phthalocyanines. The phthalocyanines are compounds of the typical formula $(C_6H_4C_2N_2)_4X$ where X stands for two hydrogen atoms or a metal atom, e. g., copper, iron, nickel, or tin, and the group $C_6H_4C_2N_2$ is so written as to indicate, in the typical formula given, that the compound is obtained by causing to interact phthalonitrile, $C_6H_4(CN)_2$, and for instance, metallic copper (see British patent specification No. 410,814 and Linstead et al., Journal of the Chemical Society (London), 1934, page 1016 ff).

The said phthalocyanine compounds may be substituted. They may, for instance, be made from the chlorophthalonitriles (e. g., 3-chlorophthalonitrile) or from other substituted phthalonitriles (e. g., 4-nitrophthalonitrile, 1:2-dicyanonaphthalene). Further, they may become halogenated at the time of formation (see British specification No. 410,814, Example 3), or may be subsequently halogenated (see co-pending application Serial No. 93,127 Linstead and Dent).

The water-insoluble phthalocyanines have the properties, as coloring matters for pigmenting purposes, of giving clear shades, which are in general, fast to light, and especially so when there are used the metal free phthalocyanines of formula $(C_8H_nHal_{4-n}N_2)_4H_2$ the copper phthalocyanines of formula $(C_6H_nHal_{4-n}N_2)_4Cu$, or the nickel phthalocyanines of formula $$(C_6H_nHal_{4-n}N_2)_4Ni.$$

The compound of the formula $(C_6H_4C_2N_2)_4Cu$ is conveniently known as copper phthalocyanine. It is adapted for coloring rubber under any conditions of vulcanisation, i. e., press, open-steam or hot air cure, or cold cure with sulphur chloride. It is completely insoluble in rubber and in hydrocarbon solvents. It is insoluble in water and unaffected by steam, so that when used in open-steam cures it shows no signs of bleeding to other rubber, to the chalk or to the wrapper. The other phthalocyanines mentioned resemble copper phthalocyanine. Also they are unaffected by acid or alkali as used in rubber processing. Hence they may be used also in latex processing. Further, they are fast to light, some, especially copper phthalocyanine, being outstandingly fast to light. In the manufacture of sponge rubber the usual blowing agents, ammonium carbonate or sodium bicarbonate, have no effect on the shade obtained according to the invention.

The invention is illustrated by the following examples in which the parts are by weight.

EXAMPLE I.—Press cure

| | Parts |
|---|---|
| Pale crepe rubber | 100 |
| Zinc oxide | 5 |
| Lithopone | 2 |
| Blanc fixe | 50 |
| Stearic acid | 1 |
| Sulphur | 2.25 |
| Accelerator (dibenz thiazyl disulphide and tetraethylthiuram disulphide) | 0.5 |
| Copper phthalocyanine | 1.6 |

The mix was made in the usual way and cured in the press for 12–13 minutes at 141° C.

The vulcanised material was of a very strong fast clear blue shade.

EXAMPLE II.—Open-steam cure

A thin sheet of the unvulcanised mix made up as described in Example I was wrapped round a mandril (metal tube) side by side with a strip of unvulcanised uncolored (white) mix (of the same composition except that the pigment was not added) the rubber sheets being wrapped around with cloth and vulcanised in open steam for 12–13 minutes at 40 lbs. per square inch steam pressure.

The fabric was then removed from the rubber and the rubber from the mandril. A parti-colored tube was thus obtained. No signs of bleeding from the colored rubber to the white rubber were observed.

EXAMPLE III.—Flooring compounds

| | Parts |
|---|---|
| Pale crepe rubber | 100 |
| Zinc oxide | 10 |
| Whiting | 280 |
| Lithopone | 15 |
| Blanc-fixe | 50 |
| Magnesium carbonate | 20 |
| Stearic acid | 1 |
| Paraffin wax | 2 |
| Sulphur | 2.5 |
| Accelerator (diphenyl guanidine tartrate and mercaptobenzthiazole) | 1.5 |
| Copper phthalocyanine | 4.82 |

The mix was made in the usual manner and vulcanised in the press for 30–45 minutes at 141° C. The vulcanised rubber was colored a strong clear blue shade.

When instead of copper phthalocyanine there was used metal-free phthalocyanine the shade obtained was greener. A still greener shade was obtained by using copper octachlorophthalocyanine. The same holds for the other examples given.

EXAMPLE IV.—*Sponge rubber*

| | Parts |
|---|---|
| Crepe rubber | 100 |
| Stearic acid | 10 |
| Petroleum jelly | 10 |
| Tetramethylthiuram monosulphide | 0.1875 |
| Chalk, precipitated | 60 |
| Zinc oxide | 5 |
| Sulphur | 3 |
| Ammonium carbonate | 10 |
| Copper phthalocyanine | 1 |

The mix was prepared from well masticated rubber. It was then rolled to give a sheet ½" thick and vulcanised in open steam for 45 minutes at 40 lbs. per square inch steam pressure.

The sponge rubber obtained in this way was of a strong blue shade, the color of which was fast to hot soap solution.

EXAMPLE V.—*Proofing mixing*

| | Parts |
|---|---|
| Pale crepe rubber | 100 |
| White factice | 80 |
| Whiting | 164 |
| Lithopone | 40 |
| Paraffin wax | 4 |
| Copper phthalocyanine | 3.88 |

The mix was made into a "dough" with solvent naphtha (about 1 part of mixing to 1¼–1½ parts of naphtha) and spread on to fabric by means of the usual spreading machine. The mixing on the fabric was vulcanised by running the fabric rubbered side down over a wooden roller partly immersed in solution of sulphur monochloride in benzene. The fabric after storing for 1 hour in a warm (45° C.) cupboard was "sweetened" by treatment with ammonia vapour. A clear full blue fast to light coated fabric was obtained.

The invention is of particular interest in connection with the coloring of ebonite. Neither the commonly used inorganic pigments nor organic coloring matters can be satisfactorily used for coloring ebonite to give a full blue shade. Thus both ultramarine, which is decomposed by acids, and Prussian blue are both decomposed during the curing of the ebonite mix. Indigo and other organic coloring matters are likewise difficult to handle and do not give full blue shades, indigo turning greener during curing. The ebonite cure, with large proportions of free sulphur present at the beginning, and some generation of sulphuretted hydrogen, involves drastic conditions from the chemical point of view.

Further, some colored ebonite goods may have to resist rough handling in use. Coatings on small metal goods, buttons, etc., may need to be launderised.

EXAMPLE VI.—*Ebonite coating on metal*

A mixture is made from

| | Parts |
|---|---|
| Crepe rubber | 100 |
| Titanium dioxide | 155 |
| Sulphur | 50 |
| Zinc oxide | 10 |

This is made plastic by working on warm rolls, and finely divided copper phthalocyanine, 8 parts, is added and uniformly mixed in on the rolls. Milling is continued until a sample of the composition dissolved in three times its weight of solvent naphtha gives a fluid of a consistence suitable for application by spraying.

The whole is then mixed with three times its weight of solvent naphtha and the mixture is sprayed on clean tinplate. The coated tinplate is baked at 140° C. for 4 hours.

There is thus obtained a bright greenish blue hard, very adherent coating of coloured ebonite on the metal. This coating preserves its shade when subjected to treatment with boiling 1% soap solution.

Modifications may be made in the above recipe, especially in the proportions of body giving white pigment and copper phthalocyanine. A varied range of shades of blue is thus obtained.

EXAMPLE VII.—*Ebonite mixing, press cure*

| | Parts |
|---|---|
| Pale crepe rubber | 100 |
| Titanium dioxide | 155 |
| Calcined magnesia | 7 |
| Sulphur | 35 |
| Copper phthalocyanine | 29.7 |

The mix was made in the usual manner and vulcanised in the press for 1½–2 hours at 150.5° C. The material was then removed from the mould, cooled and polished. The ebonite obtained as above was of a strong blue shade—lighter shades can be made by reducing the amount of copper phthalocyanine EXAMPLE VIII.—*Ebonite mixing, open steam cure*

A sheet of the unvulcanised mixing described in Example VII was rolled up to produce a rod of about ¾" diameter. The rod was then wrapped with a strip of cloth and vulcanised in open steam, the steam pressure rising during 30 mins. to 55 lbs. per square inch and being kept at that for 1½–1¾ hours.

After vulcanising the cloth was removed and the rod was allowed to cool, being then turned and polished in the lathe.

In the above examples nickel phthalocyanines may be used instead of copper phthalocyanines to give similar results with somewhat greener shades.

We claim:

1. A process for the production of colored rubber-cloth which comprises coating textile fabric with a fluid rubber composition containing a water-insoluble phthalocyanine coloring matter and thereafter vulcanising the rubber in the coating so obtained by exposure to sulphur chloride.

2. A colored vulcanized rubber fabric, the principal coloring constituent of which is copper phthalocyanine, dispersed throughout the rubber layer of the fabric.

WILLIAM JOHN ROY EVANS.
WALTER FAIRBAIRN SMITH.